United States Patent
Koruthu et al.

(10) Patent No.: US 12,192,774 B2
(45) Date of Patent: Jan. 7, 2025

(54) DYNAMIC SPATIAL REUSE PROTECTION IN MESH NETWORK

(71) Applicant: MediaTek Singapore Pte. Ltd., Singapore (SG)

(72) Inventors: George Koruthu, Uttar Pradesh (IN); Prakhar Vig, Uttar Pradesh (IN); Amit Shakya, Uttar Pradesh (IN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 493 days.

(21) Appl. No.: 17/684,497

(22) Filed: Mar. 2, 2022

(65) Prior Publication Data

US 2022/0303780 A1     Sep. 22, 2022

(30) Foreign Application Priority Data

Mar. 19, 2021  (IN) .............................. 202121011825

(51) Int. Cl.
  *H04W 24/10*  (2009.01)
  *H04L 43/16*  (2022.01)
  *H04W 16/02*  (2009.01)
  *H04W 84/18*  (2009.01)
(52) U.S. Cl.
  CPC ............. *H04W 16/02* (2013.01); *H04L 43/16* (2013.01); *H04W 24/10* (2013.01); *H04W 84/18* (2013.01)

(58) Field of Classification Search
  CPC ..... H04W 16/02; H04W 24/10; H04W 24/02; H04W 84/18; H04W 84/12; H04L 43/16
  See application file for complete search history.

(56) References Cited

U.S. PATENT DOCUMENTS

| | | | | |
|---|---|---|---|---|
| 2017/0359821 A1* | 12/2017 | Zhou | ................. | H04W 72/0446 |
| 2018/0132278 A1* | 5/2018 | Oteri | ................. | H04W 74/0808 |
| 2018/0376467 A1* | 12/2018 | Patil | ........................ | H04B 7/063 |

* cited by examiner

*Primary Examiner* — Jae Y Lee
*Assistant Examiner* — H. R.
(74) *Attorney, Agent, or Firm* — McClure, Qualey & Rodack, LLP

(57) ABSTRACT

A device is provided. The device includes: at least one antenna and a circuit. The circuit communicates with one or more agent devices through the at least one antenna, wherein the device and the one or more agent devices form a mesh network. The circuit periodically obtains a scan report from each agent device, and determines whether an OBSS (overlapping basic service set) airtime in the scan report of each agent device satisfies a first predetermined condition. In response to the OBSS airtime of each agent device satisfying the first predetermined condition, the circuit disables spatial reuse of each agent device by updating a plurality of spatial-reuse parameters for each agent device.

20 Claims, 5 Drawing Sheets

DYNAMIC SPATIAL REUSE PROTECTION IN MESH NETWORK

CROSS REFERENCE TO RELATED APPLICATIONS

This application claims the benefits of India Provisional Application No. 202121011825 filed on Mar. 19, 2021, the entirety of which is incorporated by reference herein.

BACKGROUND OF THE INVENTION

Field of the Invention

The present invention relates to wireless-network communications, and, in particular, to a device and a method for dynamic spatial reuse protection in a mesh network.

Description of the Related Art

IEEE 802.11 is a set of media access control (MAC) and physical layer (PHY) specifications for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11ac is a wireless networking standard in the IEEE 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac. Recently, WLAN has seen exponential growth across organizations in many industries.

In IEEE 802.11ac WLAN systems, the transmitter of a BSS (basis service set) of certain bandwidth is allowed to transmit radio signals into the shared wireless medium depending on clear channel assessment (CCA) sensing and a deferral or backoff procedure for channel access contention. An enhanced distributed channel access protocol (EDCA) is used in IEEE 802.11ac as a channel contention procedure for wireless devices to gain access to the shared wireless medium, e.g., to obtain a transmitting opportunity (TXOP) for transmitting radio signals into the shared wireless medium. The basic assumption of EDCA is that a packet collision can occur if a device transmits signal under the channel busy condition when the received signal level is higher than the CCA level. This simple CSMA/CA with random back-off contention scheme and low-cost ad hoc deployment in an unlicensed spectrum have contributed to the rapid adoption of IEEE 802.11ac Wi-Fi systems.

Today, Wi-Fi devices are over-populated. Dense deployment has led to significant issues such as interference, congestion, and low throughput. The spatial reuse technique introduced in the IEEE 802.11ax protocol may lead to a significant increase in the network throughput in some dense deployment scenarios because more simultaneous transmissions can happen in multiple overlapping BSSs (OBSSs). However, more usage of spatial reuse also introduces more collisions and interference into the networks.

Accordingly, there is demand for a method for dynamic spatial reuse protection in a mesh network and a device using the same to solve the aforementioned issue.

BRIEF SUMMARY OF THE INVENTION

An embodiment of the present invention provides a device. The device includes: at least one antenna and a circuit. The circuit communicates with one or more agent devices through the at least one antenna, wherein the device and the one or more agent devices form a mesh network. The circuit periodically obtains a scan report from each agent device, and determines whether an OBSS (overlapping basic service set) airtime in the scan report of each agent device satisfies a first predetermined condition. In response to the OBSS airtime of each agent device satisfying the first predetermined condition, the circuit disables spatial reuse of each agent device by updating a plurality of spatial-reuse parameters for each agent device.

In some embodiments, the scan report comprises the OBSS airtime currently used by each agent device. The first predetermined condition indicates that the OBSS airtime of each agent device is consistently longer than a first predetermined threshold over a predetermined time interval.

In some embodiments, the spatial-reuse parameters comprise an SRG (spatial reuse group) bitmap. In response to the OBSS airtime of each agent device satisfying the predetermined condition, the circuit updates the SRG bitmap using BSS colors of one or more BSS's currently used by the device and the one or more agent devices in the mesh network.

In some embodiments, the spatial-reuse parameters further comprise a plurality of spatial-reuse offset parameters which comprise SRG OBSS PD (preamble detection) Min Offset and SRG OBSS PD Max Offset in the Spatial Reuse Parameter Set element defined in IEEE 802.11ax protocol. In response to the OBSS airtime of each agent device satisfying the predetermined condition, the circuit updates the spatial-reuse offset parameters to 0.

In some embodiments, each agent device uses a baseline OBSS PD threshold as an OBSS SRG PD threshold after the installation of the updated spatial-reuse parameters. The baseline OBSS PD threshold is −82 dBm.

In some embodiments, when the circuit determines that the OBSS airtime of each agent device is not consistently higher than the predetermined threshold in a given time interval, the circuit discards the determination result of the given time interval.

In some embodiments, the circuit stores original spatial-reuse parameters in a local database before updating the spatial-reuse parameters, wherein after spatial reuse of each agent device is disabled, the circuit determines whether the OBSS airtime reported by each agent device is consistently lower than a second predetermined threshold which is lower than the first predetermined threshold, wherein in response to the OBSS airtime reported by each agent device being consistently lower than the second predetermined threshold, the circuit sends another frame packet to each agent device to install the original spatial-reuse parameters stored in the local database on each agent device to re-enable spatial reuse of each agent device.

Another embodiment of the present invention provides a method. The method includes the following steps: communicating, via a device, with one or more agent devices through at least one antenna, wherein the device and the one or more agent devices form a mesh network; utilizing the device to periodically obtain a scan report from each agent device, and to determine whether an OBSS (overlapping basic service set) airtime in the scan report of each agent device satisfies a first predetermined condition; and in response to the OBSS airtime of each agent device satisfying the first predetermined condition, utilizing the device to disable spatial reuse of each agent device by updating a plurality of spatial-reuse parameters for each agent device.

In some embodiments, the scan report comprises the OBSS airtime currently used by each agent device. The first predetermined condition indicates that the OBSS airtime of each agent device is longer than a first predetermined threshold over a predetermined time interval.

In some embodiments, the spatial-reuse parameters comprise an SRG (spatial reuse group) bitmap, and the method further comprises the following step: in response to the OBSS airtime of each agent device satisfying the predetermined condition, utilizing the device to update the SRG bitmap using BSS colors of one or more BSS's currently used by the device and the one or more agent devices in the mesh network.

In some embodiments, the spatial-reuse parameters further comprise a plurality of spatial-reuse offset parameters which comprise SRG OBSS PD (preamble detection) Min Offset and SRG OBSS PD Max Offset in the Spatial Reuse Parameter Set element defined in IEEE 802.11ax protocol, and the method further comprises the following step: in response to the OBSS airtime of each agent device satisfying the predetermined condition, utilizing the device to update the spatial-reuse offset parameters to 0.

In some embodiments, each agent device uses a baseline OBSS PD threshold as an OBSS SRG PD threshold after the installation of the updated spatial-reuse parameters. The baseline OBSS PD threshold is −82 dBm.

In some embodiments, the method further comprises the following step: when it is determined that that the OBSS airtime of each agent device is not consistently higher than the predetermined threshold in a given time interval, discarding the determination result of the given time interval.

In some embodiments, the method further comprises the following steps: utilizing the device to store original spatial-reuse parameters used by each agent device in a local database before updating the spatial-reuse parameters; after spatial reuse of each agent device is disabled, utilizing the device to determine whether the OBSS airtime reported by each agent device is consistently lower than a second predetermined threshold which is lower than the first predetermined threshold; and in response to the OBSS airtime reported by each agent device being consistently lower than the second predetermined threshold, utilizing the device to send another frame packet to each agent device to install the original spatial-reuse parameters stored in the local database on each agent device to re-enable spatial reuse.

Yet another embodiment of the present invention provides a method. The method includes the following steps: communicating, via a device, with one or more agent devices through at least one antenna, wherein the device and the one or more agent devices form a mesh network; utilizing the device to periodically obtain an activity status of one or more OBSS's (overlapping basic service set) from each agent device, and to determine whether the activity status of each agent device satisfies a predetermined condition; and in response to the activity status of each agent device satisfying the predetermined condition, utilizing the device to disable spatial reuse of each agent device by updating a plurality of spatial-reuse parameters for each agent device.

In some embodiments, the activity status indicates the OBSS airtime, and the spatial-reuse parameters comprise an SRG (spatial reuse group) bitmap, and SRG OBSS PD (preamble detection) Min Offset and SRG OBSS PD Max Offset in the Spatial Reuse Parameter Set element defined in IEEE 802.11ax protocol.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
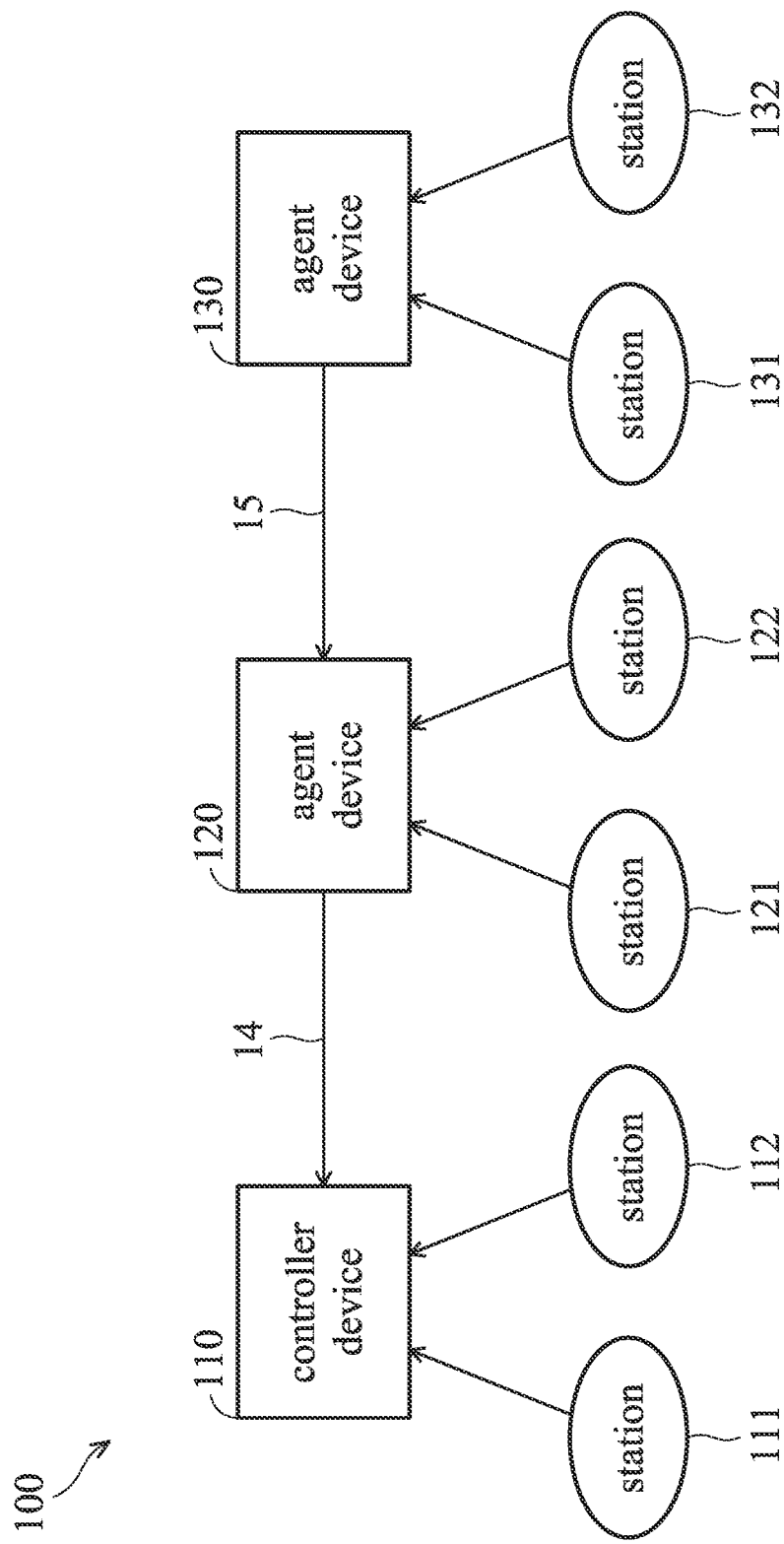
FIG. 1A is a diagram of a mesh network in accordance with an embodiment of the invention.

FIG. 1A is a diagram of a mesh network in accordance with an embodiment of the invention.

The mesh network 100 may include a controller device 110 and one or more agent devices 120 and 130, wherein the agent devices 120 and 130 may be all or part of the agent devices that are located within the range of the controller device 110. In addition, the controller device 110 and the agent devices 120 and 130 may be mesh nodes in the mesh network 100. In an embodiment, the controller device 110 and the agent devices 120 and 130 may include wireless routers, access points, laptops, desktop computers, smartphones, tablet PCs, etc. Although FIG. 1A shows one controller device 110 and two agent devices 120 and 130, one of ordinary skill in the art will readily recognize that there could be any number of agent devices, and such numbers would be within the spirit and scope of the invention.

More specifically, a mesh network allows nodes or access points (e.g., controller device 110 and agent devices 120 and 130 to communicate directly with other nodes without being routed through a central switch point, e.g., a hub. In some embodiments, the controller device 110 and the agent devices 120 and 130 maintain the mesh network 100 by associating and authenticating new agent devices such as stations (STA), and by coordinating transmissions based on time and bandwidth requests by the agent devices 120 and 130.

As depicted in FIG. 1A, it is assumed that the controller device 110 and agent devices 120 and 130 in the mesh network 100 supports IEEE 802.11ax (Wi-Fi 6) standard. Stations 111 and 112 are connected to the controller device 110. The agent device 120 is connected to the controller device 110 by a Wi-Fi link 14, and stations 121 and 122 are connected to the agent device 120. The agent device 130 is connected to the controller device 110 through the agent device 120 by a Wi-Fi link 15, and stations 131 and 132 are connected to the agent device 130. In this embodiment, the mesh network 100 can be considered as a dense network (i.e., a densely-deployed network), and the controller device 110 and agent devices 120 and 130 may enable the dynamic spatial-reuse function, and the details of the dynamic spatial-reuse function will be described later.

Figure 1B:
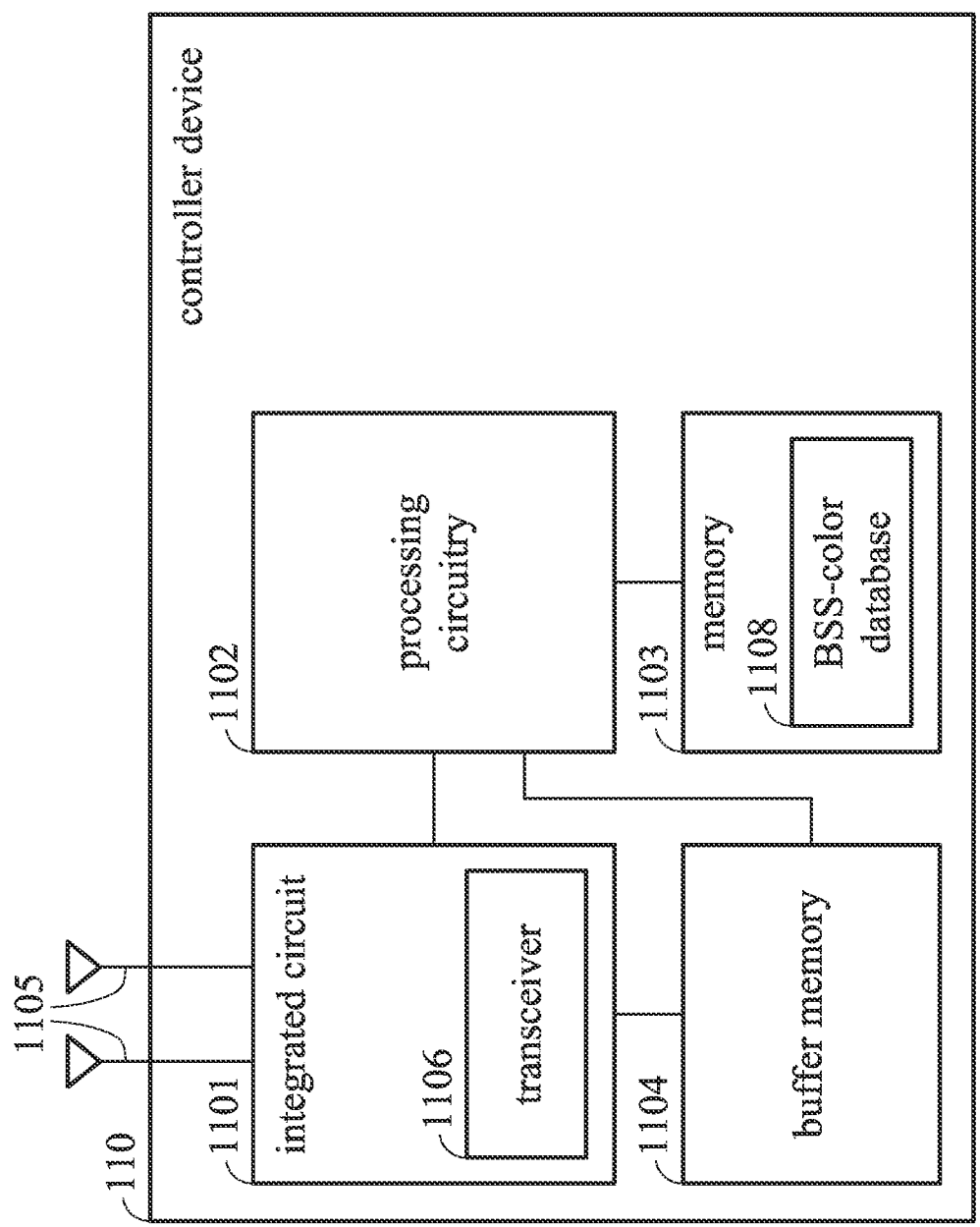
FIG. 1B is a block diagram of the controller device in accordance with the embodiment of FIG. 1A.

FIG. 1B is a block diagram of the controller device in accordance with the embodiment of FIG. 1A.

The controller device 110 may include an integrated circuit 1101, processing circuitry 1102, a memory 1103, a buffer memory 1104, and at least one antenna 1105. The antennas 1105 may transmit and receive radio frequency (RF) signals. The integrated circuit 1101 is coupled to the antennas 1105, and the integrated circuit 1101 may include one or more transceivers 1106 which may receive RF signal from the antennas 1105, convert them to baseband signals, and send the baseband signals to the processing circuitry 1102. The transceivers 1106 may also convert the baseband signals from the processing circuitry 1102, convert them to RF signal, and send out the RF signals to antennas 1105. In some embodiments, the integrated circuit 1101 may support functions of SU-MIMO (single-user multi-input multi-output) and MU-MIMO (multi-user multi-input multi-output), but the disclosure is not limited thereto. In some embodiments, the processing circuitry 1102 may be implemented by a central processing unit (CPU), a general-purpose processor, a digital signal processor (DSP), or a microcontroller, but the disclosure is not limited thereto.

In some embodiments, the integrated circuit 1101 may be a Wi-Fi chip, and the integrated circuit 1101 and the processing circuitry 1102 may be implemented by a system-on-chip (SoC), but the disclosure is not limited thereto. The memory 1103 may be a volatile memory or a non-volatile memory. For example, the volatile memory may be a static random access memory (SRAM) or a dynamic random access memory (DRAM), and the non-volatile memory may be a flash memory, a read-only memory (ROM), an erasable programmable read-only memory (EPROM), or an electrically erasable programmable read-only memory (EEPROM), but the disclosure is not limited thereto. In addition, the memory 1103 may store instructions or firmware that can be executed by the processing circuitry 1102 to control operations of the controller device 110. In some embodiments, components in the agent devices 120 and 130 may be similar to those in the controller device 110, and the details will not be repeated here.

In addition, the controller device 110 may maintain a BSS-color database 1108 that records the BSS colors used by its surrounding devices (including the agent devices in the mesh network 100) where the BSS-color database 1108 may be stored in the memory 1103 of the controller device 110. Thus, the controller device 110 (or agent device 120 or 130) may select the appropriate BSS color which is available (i.e., unused) according to the BSS-color database 1108. In addition, the controller device 110 may update an spatial-reuse group (SRG) bitmap on the agent devices from which they can know whether an incoming frame is of their own network (e.g., mesh network 100) or not. The controller device 110 may determine whether to perform SR for frames of its own network (e.g., mesh network 100) based on an OBSS airtime received from each agent device in the mesh network 100, where the details will be described later.

Please refer to FIGS. 1A and 1B. The spatial reuse feature in IEEE 802.11ax may maximize the utilization of the medium by increasing the number of parallel transmissions, and it allows CCA-PD (clear channel assessment preamble detection) to be changed within the range from −62 dBm to −82 dBm. Each BSS in the mesh network 100 is assigned a unique color code called a BSS color. The BSS color enables each of the devices in the mesh network 100 (i.e., the controller device 110, agent devices 120 and 130, and stations 111-112, 121-122, and 131-132) to decide whether the simultaneous use of frequency spectrum along with the OBSS is allowed or not. When the SR feature is enabled on a specific station in the mesh network 100, the specific station may ignore the frames from the OBSS and enable concurrent transmission of data to multiple devices in the mesh network 100.

In addition, the OBSS PD (overlapping basic service set packet detection) feature in IEEE 802.11ax allows BSS colors to be used as a way to create a spatial reuse group (SRG) which can be implemented using a bitmap of BSS colors. The SRG can be configured with the OBSS-PD SRG threshold which is basically the CCA-PD threshold whose value can range between −62 dBm and −82 dBm. Thus, for a specific station in the mesh network 100, the specific station may determine whether the BSS color of an incoming frame (e.g., an 802.11ax frame) is part of the SRG. If it is determined that the BSS color of the incoming frame is part of the SRG, the specific station may compare the RSSI (received signal strength indication) of the incoming 802.11ax frame with the OBSS-PD SRG threshold.

If the RSSI of the incoming frame is lower than the OBSS-PD SRG threshold, the CCA performed by the specific station will not update NAV (network allocation vector), and will discard the incoming frame. At this time, the medium is considered idle, and the SR transmission can be done to make use of the medium. It should be noted that although the increasing number of parallel transmissions could potentially improve network performance of BSSs operating in the same frequency, there is also a higher chance of interference due to SR transmissions if the SR feature is enabled.

Figure 2A:
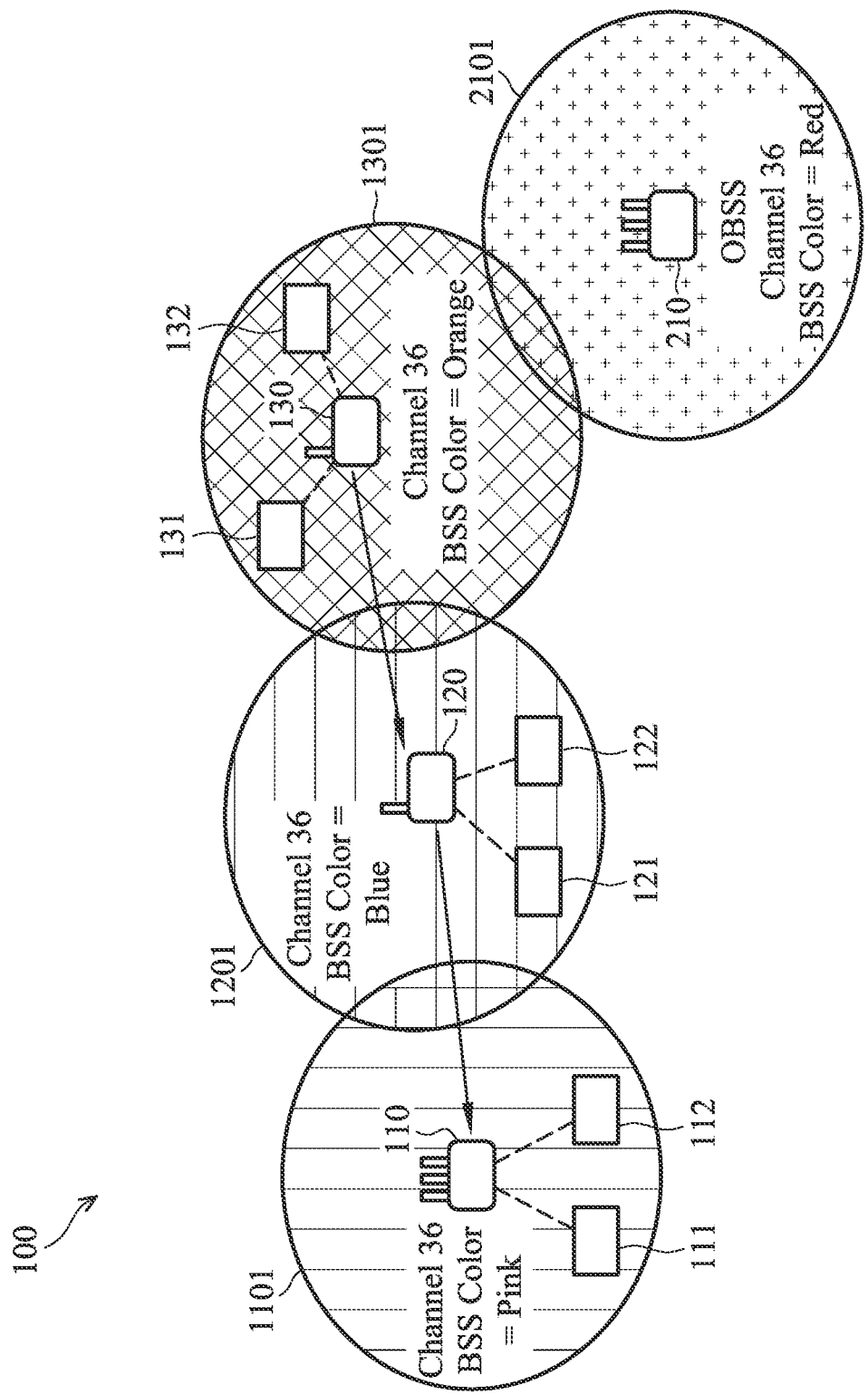
FIG. 2A is a diagram of the mesh network including an OBSS in accordance with the embodiment of FIG. 1A.
Figure 2B:
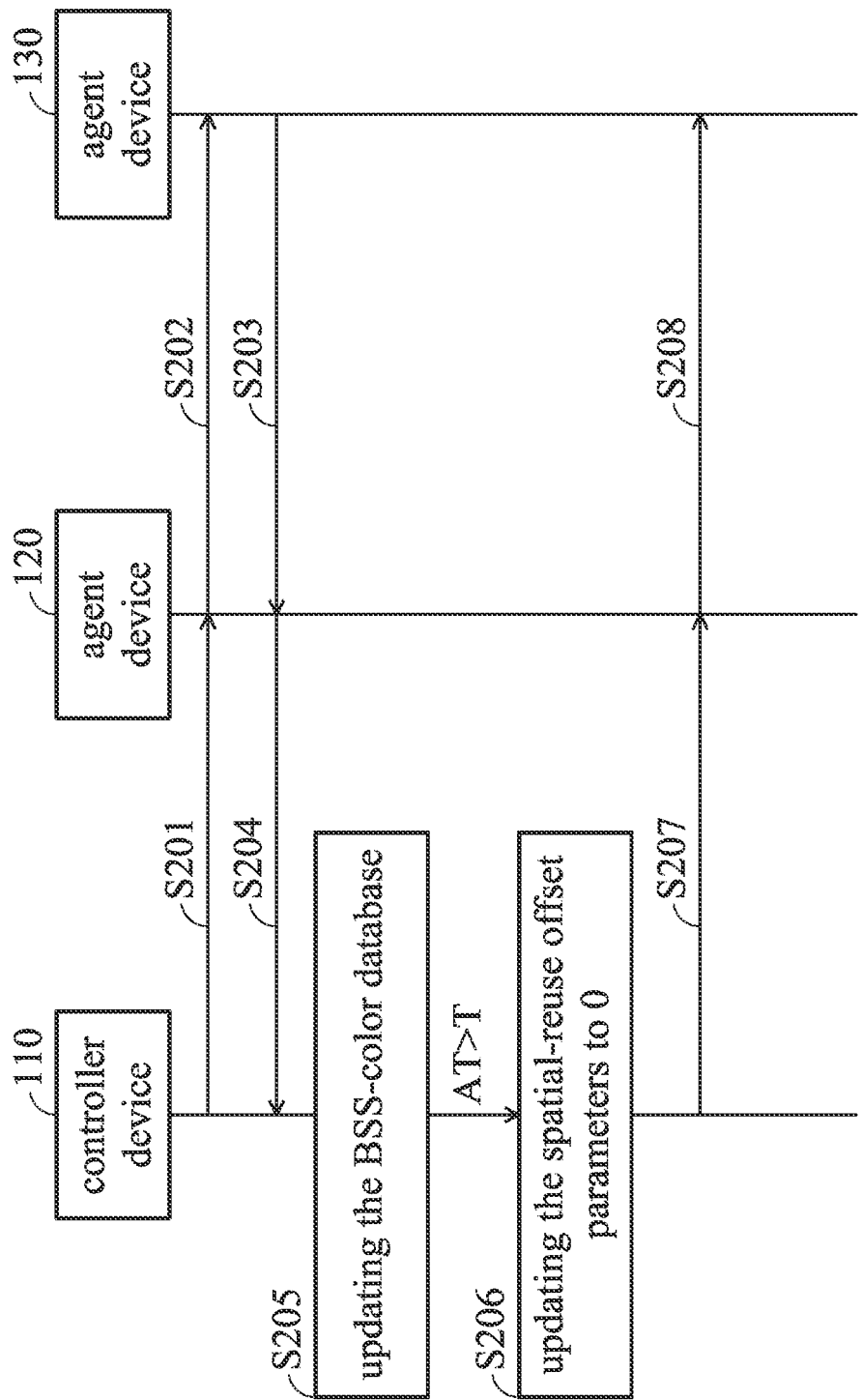
FIG. 2B is a diagram illustrating the flow of the dynamic spatial reuse technique in accordance with the embodiment of FIG. 2A.

FIG. 2A is a diagram of the mesh network including an OBSS in accordance with the embodiment of FIG. 1A. FIG. 2B is a diagram illustrating the flow of the dynamic spatial reuse technique in accordance with the embodiment of FIG. 2A. Please refer to FIG. 1A and FIGS. 2A-2B.

For ease of description, it is assumed that the mesh network 100 is a dense network and the SR feature of all devices (i.e., APs) in the mesh network 100 is enabled. The controller device 110 and agent devices 120 and 130 are assigned with BSS colors of Pink, Blue, and Orange (e.g., the BSS color may be assigned by each agent device or by the controller device 110), as shown in FIG. 2A. When the controller device 110 and agent devices 120 and 130 are booted up, they can scan the BSS colors used in a particular Wi-Fi channel (e.g., channel 36) within their respective range 1101, 1201, and 1301. In addition, an AP 210, which has a range 2101, has its own BSS color of Red. Since range 1301 of the agent device 130 overlaps with range 2101 of the AP 210, the agent device 130 may detect that an OBSS exists in the mesh network 100.

Each of the agent devices 120 and 130 in the mesh network 100 is capable of detecting the OBSS airtime information. For example, there may be some other APs (access points) or STAs, which are not belonging to the mesh network 100, nearby each agent device, and these APs and STAs may be considered as the OBSS. In the embodiment of FIG. 2A, the AP 210 is considered as the OBSS. For example, the OBSS airtime can be regarded as activity status of the OBSS. If the OBSS airtime is too high for any of the agent devices, this indicates that there is high OBSS activity which is decided by a predefined threshold (e.g., OBSS PD threshold).

In addition to the BSS color, each agent device may also keep the information about its OBSS PD threshold and OBSS airtime, and the SRG bitmap of the mesh network 100. The controller device 110 may send query requests to the agent devices 120 and 130 to obtain the scan reports which may include information about OBSS airtime from the agent devices 120 and 130. For example, as shown in FIG. 2A, since the agent device 130 is connected to the controller device 110 through the agent device 120, the controller device 110 may periodically send a first query signal and a second query signal respectively to the agent device 120 and agent device 130 (steps S201 and S202), where the agent device 120 may forward the second query signal to the agent device 130.

In response to the second query signal, the agent device 130 may send its scan report to the controller device 110 through the agent device 120 (step S203). In response to the first query signal, the agent device 120 may send its scan report to the controller device 110 (step S204). For example, the scan reports from the agent devices 120 and 130 may include information about their respective OBSS airtime that is currently used. Thus, the controller device 110 may update the BSS-color database using the BSS colors and their corresponding BSS-IDs in the scan reports (step S205). For getting information about the BSS color, SRG bitmap, and OBSS PD threshold for each agent device, the controller device 110 may use a proprietary frame or any other frame to obtain the aforementioned information from each agent device. In addition, each agent device may use a SR report TLV defined in the Multi-AP specification to share information about its BSS color, SRG bitmap, and OBSS PD threshold to the controller device 110.

In this time, the controller device 110 may keep monitoring the OBSS airtime reported by each agent device at every predetermined time interval. In response to the OBSS airtime AT reported by any agent device being consistently longer than a predetermined threshold T over one predetermined time interval, the controller device 110 may create an SRG bitmap with BSS colors being used by all BSS's in the mesh network 100, and update the spatial-reuse offset parameters, such as the SRG OBSS PD Min Offset and SRG OBSS PD Max Offset in the Spatial Reuse Parameter Set element, to 0 in the mesh network 100 (step S206), and set the OBSS PD threshold to the least value (i.e., −82 dBm). For example, the determination result is obtained at every predetermined time interval to avoid any OBSS airtime spikes. If the OBSS airtime AT reported by any agent device is consistently longer than a predetermined threshold T over the current time interval, it may indicate that the OBSS may cause high interference to the mesh network 100. If the OBSS airtime AT reported by any agent device is not consistently longer than the predetermined threshold T over the current time interval, this may indicate that there may be an OBSS airtime spike within the current time interval, and the determination result of the current time interval will be discarded by the controller device 110.

Specifically, the parameter "SRG OBSS PD Min", which indicates the minimum power detect threshold under an SRG, can be calculated as (baseline threshold+SRG OBSS PD Min Offset) dBm. The parameter "SRG OBSS PD Max", which indicates the maximum power detect threshold under an SRG, can be calculated as (baseline threshold+SRG OBSS PD Max Offset) dBm. The baseline threshold is −82 dBm which is the least possible OBSS threshold defined in the IEEE 802.11ax protocol.

Accordingly, when the aforementioned spatial-reuse offset parameters SRG OBSS PD Min Offset and SRG OBSS PD Max Offset are set to 0 and the OBSS PD threshold is set to the baseline value (i.e., the least value of −82 dBm), the SRG OBSS PD threshold can be a fixed value equal to the baseline value of −82 dBm. Thus, the CCA level can be decreased to a minimum level, and the spatial-reuse feature will be effectively disabled by the controller device 110 and agent devices 120 and 130.

Specifically, the controller device 110 may use the OBSS airtime from each agent device as a trigger to update the SRG bitmap for BSS colors being used by all BSS's in the mesh network 100, and to configure the OBSS PD threshold to the least value (i.e., −82 dBm) in order to ensure that all BSS's belonging to the mesh network 100 are heard. In addition, the controller device 110 may store original SR parameters, such as the SRG bitmap and the OBSS PD thresholds (and/or the aforementioned spatial-reuse offset parameters SRG OBSS PD Min Offset and SRG OBSS PD Max Offset), currently used by the agent devices 120 and 130 in a local database (not shown in FIG. 1B) of the controller device 110 for future use, such as re-enabling the SR feature of the devices in the mesh network 100.

Then, the controller device 110 may send frame packets to each agent device to install the updated SRG bitmap and new OBSS PD threshold (steps S207 and S208) on each agent device. As a result, all devices (i.e., the controller device 110 and agent devices 120 and 130) in the mesh network 100 will use the least possible OBSS PD threshold (i.e., −82 dBm without any offset) so as to effectively disable the SR feature of all agent devices in the mesh network 100.

In addition, after the SR feature of all agent devices in the mesh network 100 is disabled, when the controller device 110 detects that the OBSS airtime obtained from each agent device is lower than the predetermined threshold T (or another predetermined threshold T2 which is lower than T), it may indicate that the interference caused by the OBSS's is low at this time, and thus the controller device 110 may send another frame to the agent devices 120 and 130 to revert back the original spatial-reuse parameters stored in the local database of the controller device 110, such as the SRG bitmap and the OBSS PD thresholds (and/or the aforementioned spatial-reuse offset parameters SRG OBSS PD Min Offset and SRG OBSS PD Max Offset), on the agent devices 120 and 130 in the mesh network 100. At this time, the CCA level used by the controller device 110 and agent devices 120 and 130 can be increased, thereby improving spatial reuse and increasing the throughput of the mesh network 100.

Figure 3:
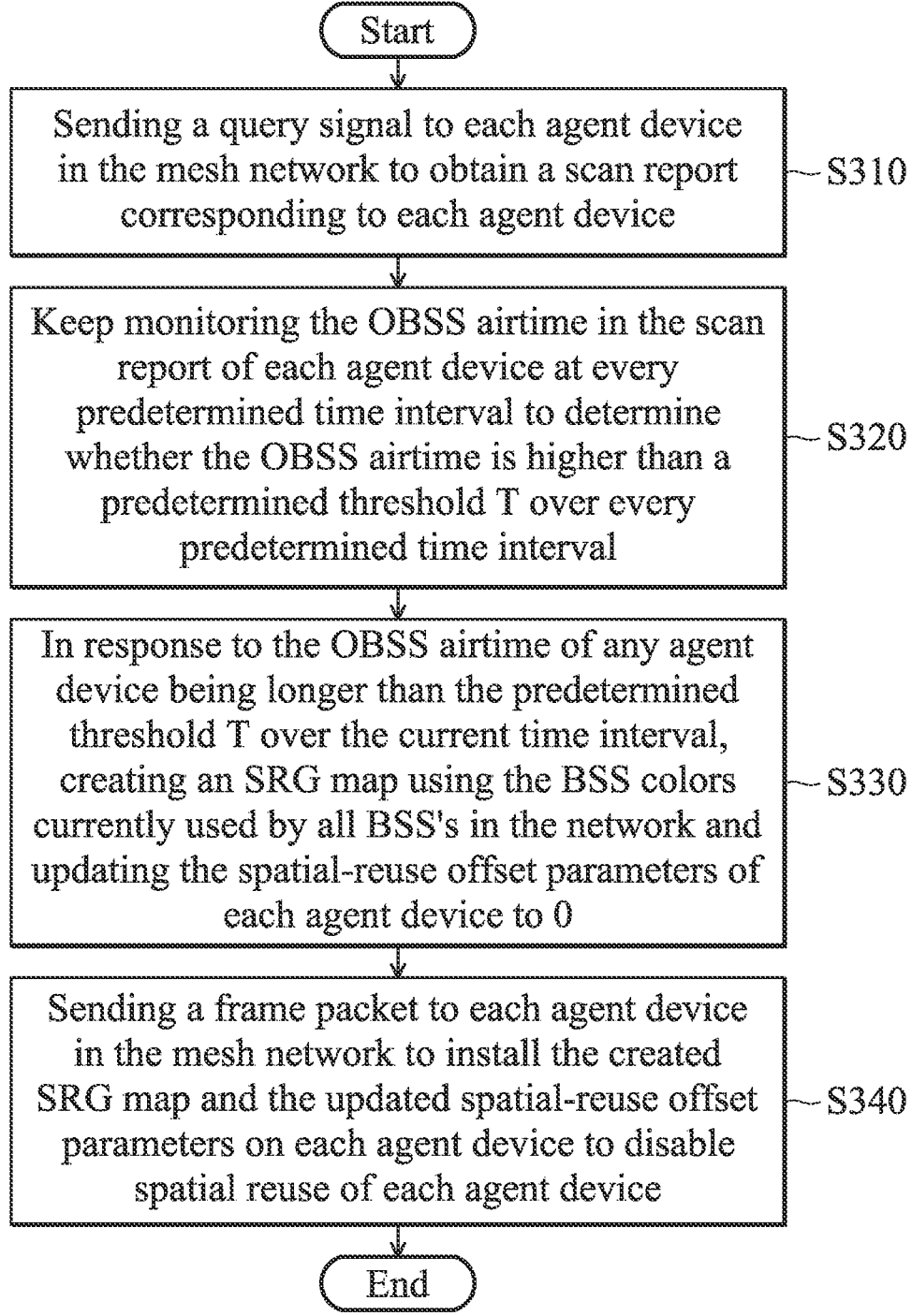
FIG. 3 is a flow chart of a method for dynamic spatial reuse protection in a mesh network in accordance with an embodiment of the invention.

FIG. 3 is a flow chart of a method for dynamic spatial reuse protection in a mesh network in accordance with an embodiment of the invention. Please refer to FIG. 1A and FIG. 3.

In step S310, the controller device 110 sends a query signal to each agent device in the mesh network 100 to obtain a scan report corresponding to each agent device. For example, each of the agent devices 120 and 130 in the mesh network 100 is capable of detecting the OBSS airtime information. For example, there may be some other APs (access points) or STAs, which are not belonging to the mesh network 100, nearby each agent device, and these APs and STAs may be considered as the OBSS. In addition to the BSS color, each agent device may also keep the information about its OBSS PD threshold and OBSS airtime, and the SRG bitmap of the mesh network 100. Thus, the scan report may include information about OBSS airtime currently used by each agent device.

In step S320, the controller device 110 keeps monitoring the OBSS airtime AT in the scan report of each agent device at every predetermined time interval TI to determine whether the OBSS airtime AT is higher than a predetermined threshold T over every predetermined time interval.

In step S330, in response to the OBSS airtime AT of any agent device being consistently longer than the predetermined threshold T over the current time interval, which indicates that the interference caused by the OBSS's is high, the controller device 110 may create an SRG map using the BSS colors currently used by all BSS's in the network and update the spatial-reuse offset parameters of each agent device to 0. For example, the aforementioned spatial-reuse offset parameters may include SRG OBSS PD Min Offset and SRG OBSS PD Max Offset in the Spatial Reuse Parameter Set element defined in the IEEE 802.11ax protocol. In addition, the controller device 110 can configure the agent devices in the mesh network 100 to disable the SR feature for all BSS colors being used by the agent devices in the mesh network 100, and thus the SR feature of the mesh network 100 can be effectively disabled.

Specifically, the parameter "SRG OBSS PD Min", which indicates the minimum power detect threshold under an SRG, can be calculated as (baseline threshold+SRG OBSS PD Min Offset) dBm. The parameter "SRG OBSS PD Max", which indicates the maximum power detect threshold under an SRG, can be calculated as (baseline threshold+SRG OBSS PD Max Offset) dBm. The baseline threshold is −82 dBm which is the least possible OBSS threshold defined in the IEEE 802.11ax protocol. In addition, the controller device 110 can configure the agent devices in the mesh network 100 to disable the SR feature for all BSS colors being used by the agent devices in the mesh network 100, and thus the SR feature of the mesh network 100 can be effectively disabled.

In step S340, the controller device 110 may send a frame packet to each agent device in the mesh network 100 to install the created SRG map and the updated spatial-reuse offset parameters on each agent device to disable spatial reuse of each agent device. For example, when the aforementioned spatial-reuse offset parameters SRG OBSS PD Min Offset and SRG OBSS PD Max Offset are set to 0 and the OBSS PD threshold is set to the baseline value (i.e., the least value of −82 dBm), the SRG OBSS PD threshold can be a fixed value equal to the baseline value of −82 dBm. Thus, the CCA level can be decreased to a minimum level, and the spatial-reuse feature will be effectively disabled by the controller device 110 and agent devices 120 and 130.

After the SR feature of all agent devices in the mesh network 100 is disabled, when the controller device 110 detects that the OBSS airtime obtained from each agent device is lower than the predetermined threshold T (or another predetermined threshold T2 which is lower than T), it may indicate that the interference caused by the OBSS's is low at this time, and thus the controller device 110 may send another frame to the agent devices 120 and 130 to revert back the original SR parameters stored in the local database of the controller device 110, such as the SRG bitmap and the OBSS PD thresholds (and/or the aforementioned spatial-reuse offset parameters SRG OBSS PD Min Offset and SRG OBSS PD Max Offset), on the agent devices 120 and 130 in the mesh network 100. At this time, the CCA level used by the controller device 110 and agent devices 120 and 130 can be increased, thereby improving spatial reuse and increasing the throughput of the mesh network 100.

In view of the above, a method for dynamic spatial reuse protection in a mesh network and a device using the same are provided, which are capable of using the OBSS airtime from each agent device in the mesh network as a trigger to update the SRG bitmap for BSS colors being used by all BSS's in the mesh network, and configuring the OBSS PD threshold to the least value in order to disable the SR feature of all agent devices in the mesh network and to ensure that all BSS's belonging to the mesh network are heard. In addition, the method and device are further capable of re-enabling the SR feature of the devices in the mesh network when the OBSS airtime reported by each agent device satisfies a predetermined condition so as to ensure dynamic spatial reuse in the mesh network.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any device that can contain, store, communicate, propagate, or transport the program for use by or in connection with the instruction execution system, device, or device.

The medium may be an electronic, magnetic, optical, electromagnetic, infrared, semiconductor system (or device or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device, comprising:
   at least one antenna; and
   a circuit, communicating with one or more agent devices through the at least one antenna, wherein the device and the one or more agent devices form a mesh network;
   wherein the circuit periodically obtains a scan report from each agent device, and determines whether an OBSS (overlapping basic service set) airtime in the scan report of each agent device satisfies a first predetermined condition,
   wherein in response to the OBSS airtime of each agent device satisfying the first predetermined condition, the circuit disables spatial reuse of each agent device by updating a plurality of spatial-reuse parameters for each agent device, wherein the spatial-reuse parameters further comprise a plurality of spatial-reuse offset parameters, and the circuit updates the spatial-reuse offset parameters to 0.

2. The device as claimed in claim 1, wherein the scan report the OBSS airtime currently used by each agent device.

3. The device as claimed in claim 2, wherein the first predetermined condition indicates that the OBSS airtime of each agent device is consistently longer than a first predetermined threshold over a predetermined time interval.

4. The device as claimed in claim 3, wherein the spatial-reuse parameters comprise an SRG (spatial reuse group) bitmap,
   wherein in response to the OBSS airtime of each agent device satisfying the predetermined condition, the circuit updates the SRG bitmap using BSS colors of one or more BSS's currently used by the device and the one or more agent devices in the mesh network.

5. The device as claimed in claim 3, wherein the spatial-reuse parameters further comprise a plurality of spatial-reuse offset parameters which comprise SRG OBSS PD (preamble detection) Min Offset and SRG OBSS PD Max Offset in the Spatial Reuse Parameter Set element defined in IEEE 802.11 ax protocol.

6. The device as claimed in claim 1, wherein each agent device uses a baseline OBSS PD threshold as an OBSS SRG PD threshold after the installation of the updated spatial-reuse parameters.

7. The device as claimed in claim 6, wherein the baseline OBSS PD threshold is −82 dBm.

8. The device as claimed in claim 1, wherein when the circuit determines that the OBSS airtime of each agent device is not consistently higher than the predetermined threshold in a given time interval, the circuit discards the determination result of the given time interval.

9. The device as claimed in claim 3, wherein the circuit stores original spatial-reuse parameters used by each agent device in a local database before updating the spatial-reuse parameters,
   wherein after spatial reuse of each agent device is disabled, the circuit determines whether the OBSS airtime reported by each agent device is consistently lower than a second predetermined threshold which is lower than the first predetermined threshold,
   wherein in response to the OBSS airtime reported by each agent device being consistently lower than the second predetermined threshold, the circuit sends another frame packet to each agent device to install the original spatial-reuse parameters stored in the local database on each agent device using a proprietary frame or a spatial-reuse request TLV to re-enable spatial reuse of each agent device.

10. A method, comprising:
    communicating, via a device, with one or more agent devices through at least one antenna, wherein the device and the one or more agent devices form a mesh network;
    utilizing the device to periodically obtain a scan report from each agent device, and to determine whether an OBSS (overlapping basic service set) airtime in the scan report of each agent device satisfies a first predetermined condition; and
    in response to the OBSS airtime of each agent device satisfying the first predetermined condition, utilizing the device to disable spatial reuse of each agent device by updating a plurality of spatial-reuse parameters for each agent device, wherein the spatial-reuse parameters further comprise a plurality of spatial-reuse offset parameters, and the circuit updates the spatial-reuse offset parameters to 0.

11. The method as claimed in claim 10, wherein the scan report comprises the OBSS airtime currently used by each agent device.

12. The method as claimed in claim 11, wherein the first predetermined condition indicates that the OBSS airtime of each agent device is consistently longer than a first predetermined threshold over a predetermined time interval.

13. The method as claimed in claim 10, wherein the spatial-reuse parameters comprise an SRG (spatial reuse group) bitmap, and the method further comprises:
    in response to the OBSS airtime of each agent device satisfying the predetermined condition, utilizing the device to update the SRG bitmap using BSS colors of one or more BSS's currently used by the device and the one or more agent devices in the mesh network.

14. The method as claimed in claim 13, wherein the spatial-reuse parameters further comprise a plurality of spatial-reuse offset parameters which comprise SRG OBSS PD (preamble detection) Min Offset and SRG OBSS PD Max Offset in the Spatial Reuse Parameter Set element defined in IEEE 802.11ax protocol.

15. The method as claimed in claim 10, wherein each agent device uses a baseline OBSS PD threshold as an OBSS SRG PD threshold after the installation of the updated spatial-reuse parameters.

16. The method as claimed in claim 15, wherein the baseline OBSS PD threshold is −82 dBm.

17. The method as claimed in claim 13, further comprising:
    when it is determined that that the OBSS airtime of each agent device is not consistently higher than the predetermined threshold in a given time interval, discarding the determination result of the given time interval.

18. The method as claimed in claim 13, further comprising:
    utilizing the device to store original spatial-reuse parameters used by each agent device in a local database before updating the spatial-reuse parameters;
    after spatial reuse of each agent device is disabled, utilizing the device to determine whether the OBSS airtime reported by each agent device is consistently lower than a second predetermined threshold which is lower than the first predetermined threshold; and
    in response to the OBSS airtime reported by each agent device being consistently lower than the second predetermined threshold, utilizing the device to send another frame packet to each agent device to install the original parameters stored in the local database on each agent device to re-enable spatial reuse of each agent device.

19. A method, comprising:

communicating, via a device, with one or more agent devices through at least one antenna, wherein the device and the one or more agent devices form a mesh network;

utilizing the device to periodically obtain an activity status of one or more OBSS's (overlapping basic service set) from each agent device, and to determine whether the activity status from each agent device satisfies a predetermined condition; and in response to the activity status of each agent device satisfying the predetermined condition, utilizing the device to disable spatial reuse of each agent device by updating a plurality of spatial-reuse parameters for each agent device, wherein the spatial-reuse parameters further comprise a plurality of spatial-reuse offset parameters, and the circuit updates the spatial-reuse offset parameters to 0.

20. The method as claimed in claim 19, wherein the activity status indicates the OBSS airtime, and the spatial-reuse parameters comprise an SRG (spatial reuse group) bitmap, and SRG OBSS PD (preamble detection) Min Offset and SRG OBSS PD Max Offset in the Spatial Reuse Parameter Set element defined in IEEE 802.11ax protocol.

\* \* \* \* \*